United States Patent [19]

Hashimoto et al.

[11] Patent Number: 4,985,225

[45] Date of Patent: Jan. 15, 1991

[54] PROCESS FOR PRODUCING ALUMINUM NITRIDE POWDERS

[75] Inventors: Noboru Hashimoto; Yasushi Sawada; Hiroyoshi Yoden, all of Osaka; Shigehito Deki, Hyogo; Hisamitsu Takahashi, Osaka, all of Japan

[73] Assignee: Matsushita Electric Works, Ltd., Osaka, Japan

[21] Appl. No.: 273,761

[22] Filed: Aug. 22, 1988

[30] Foreign Application Priority Data

Oct. 26, 1987 [JP] Japan ................................ 62-271050
Nov. 28, 1987 [JP] Japan ................................ 62-301301
Mar. 19, 1988 [JP] Japan ................................ 63-66154

[51] Int. Cl.$^5$ ............................................ C01B 21/072
[52] U.S. Cl. ................................................. 423/412
[58] Field of Search ....................................... 423/412

[56] References Cited

U.S. PATENT DOCUMENTS 4,528,119  7/1985  Barnes ................................ 252/503
4,780,299 10/1988  Kumagai et al. .................... 423/412

FOREIGN PATENT DOCUMENTS 186144     7/1986  European Pat. Off. ............ 423/412
2685       1/1986  Japan ................................. 423/412
6105       1/1986  Japan ................................. 423/412
62-132170  6/1987  Japan .
30307      2/1988  Japan ................................. 423/412
55109      3/1988  Japan ................................. 423/412
22837      of 1915 United Kingdom ............... 423/412

*Primary Examiner*—Wayne A. Langel
*Attorney, Agent, or Firm*—Sughrue, Mion, Zinn, Macpeak & Seas

[57] ABSTRACT

A process for producing aluminum nitride powders is disclosed, which comprises mixing a water-soluble aluminum-containing compound or an aluminum alkoxide and a water-soluble carbon-containing compound and/or a water-soluble nitrogen-containing compound, with water; drying the mixture to obtain a solid; and calcining the solid in a nitrogen-containing non-oxidative atmosphere. According to the process of the invention, high-purity uniform aluminum nitride fine powders can be obtained rapidly and inexpensively.

12 Claims, No Drawings

PROCESS FOR PRODUCING ALUMINUM NITRIDE POWDERS

FIELD OF THE INVENTION

The present invention relates to a process for producing aluminum nitride powders suited for the production of high heat conductive substrates.

BACKGROUND OF THE INVENTION

With the progress of high integration or large power consumption of semi conductor elements represented by IC (integrated circuit) and the like, realization of electrical insulating materials having good heat dissipation properties has been demanded. In order to meet this demand, various high heat conductive substrates have been proposed. Among them, aluminum nitride ceramic substrates have excellent properties in heat conduction, heat expansion and electrical insulation and, hence, have most keenly been being attempted to put into the practical use.

However, the aluminum nitride ceramic substrate has a defect that the price is expensive. As the reasons why the cost is expensive, there may be considered the following reasons: (1) the price of aluminum nitride powder used as the starting material is expensive; and (2) high-temperature sintering is required.

Hitherto, aluminum nitride powders have been produced by direct nitriding of aluminum or carbon reduction of alumina. For example, in the direct nitriding of aluminum, it is difficult to produce high-purity aluminum nitride powders having a small particle diameter. On the other hand, in the carbon reduction, the reaction must be carried out at high temperatures, leading to an increase in production cost. As an improvement of the carbon reduction of alumina, there is proposed a method in which an aluminum source is mixed in a solution state. However, in this proposed method, the mixing is carried out in a suspended state but not in the order of molecule and, therefore, the reaction must still be carried out at high temperatures, leading to an expensive production cost, too.

SUMMARY OF THE INVENTION

Under such circumstances, the present invention has been made. That is, an object of the present invention is to provide a process for producing high-purity, aluminum nitride fine powders which can be readily sintered, with an inexpensive production cost.

The present invention relates to a process for producing aluminum nitride powders, comprising mixing a water-soluble aluminum-containing compound or an aluminum alkoxide and a water-soluble carbon-containing compound and/or a water-soluble nitrogen-containing compound, with water; drying the mixture to obtain a solid; and calcining the solid in a nitrogen-containing non-oxidative atmosphere.

DETAILED DESCRIPTION OF THE INVENTION

The water soluble aluminum-containing compound as referred to in the present invention, which is used as an aluminum source, means a water-soluble aluminum compound which ultimately forms an aluminum nitride compound and which is considered to form an intermediate through conversion of the initial compound, that is not a mere mixture, during the calcination step but before forming the aluminum nitride compound.

Examples of the water-soluble aluminum-containing compound which can be used include water-soluble aluminum compounds (e.g., aluminum nitrate and aluminum sulfate) and aluminum polynuclear complexes. The aluminum polynuclear complex as referred to herein means a compound containing a complex having two or more central aluminum atoms, such as basic aluminum chloride expressed by the following chemical formula:

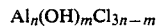

$Al_n(OH)_m Cl_{3n-m}$ wherein m is not 0, and 3n is greater than m, and basic aluminum nitrate.

Also, basic aluminum lactate is useful as the aluminum polynuclear complex. This basic aluminum lactate is particularly preferred because it is usually present in the form of an aqueous solution and does not contain sulfuric acid ion, chlorine ion, nitric acid ion, etc. so that it does not adversely affect the reduction reaction at the time of synthesis of aluminum nitride.

The water-soluble aluminum-containing compound can be used in combination with a water-soluble organic solvent such as alcohols.

In the case that an aluminum alkoxide is used as the aluminum source, since the aluminum alkoxide is not soluble in water, a tetraalkylammonium hydroxide, triethanolamine, or diethanolamine is added to the aluminum alkoxide to thereby render it soluble in water. In the alternative, the aluminum alkoxide is dissolved in a water-soluble organic solvent such as alcohols, to form a hydrolyzate which is subsequently provided for the mixing.

Examples of the aluminum alkoxide which can be used include those having not more than 10 carbon atoms, such as aluminum methoxide, aluminum ethoxide, aluminum propoxide, and aluminum isopropoxide. But, the present invention is not particularly restricted to these exemplified compounds.

The tetraalkylammonium hydroxide is not particularly restricted but those having not more than 10 carbon atoms are preferred. Specific examples include tetramethylammonium hydroxide, tetraethylammonium hydroxide, and tetrapropylammonium hydroxide.

The water-soluble aluminum-containing compound or the aluminum alkoxide which has been rendered soluble in water is mixed with a water-soluble carbon-containing compound and/or a water-soluble nitrogen-containing compound as an aqueous solution. In this case, the respective starting materials can be individually dissolved in water, followed by mixing these aqueous solutions to obtain a mixed aqueous solution. Alternatively, a mixture of the starting materials can first be prepared and then dissolved in water to obtain a mixed aqueous solution. In this mixed aqueous solution, the respective components are uniformly mixed in the order of molecule.

The aluminum alkoxide can be used in a similar manner to that in the case of the above-described water-soluble aluminum-containing compound. In this case the aluminum alkoxide is first dissolved in a lower alcohol of heat molten and then mixed with a water-soluble carbon-containing compound and/or a water-soluble nitrogen-containing compound dissolved in water. Though the resulting aluminum alkoxide is often precipitated as aluminum hydroxide, if it is dried as such, the system becomes a substantially uniform mixture.

Examples of the water-soluble carbon-containing compound which can be used include saccharides such as glucose and lactose, cellulose derivatives such as methyl cellulose, polyethyeene oxide, polyvinyl alcohol, and lignin.

Examples of the water-soluble nitrogen-containing compound which can be used include not only urea but also ammonium chloride, melamine, glycine, carbonyl hydrazide, and ethylenediamine. If the water-soluble nitrogen-containing compound containing a carbon atom or atoms in the molecule thereof, such as urea, is used, it can also function as the water-soluble carbon-containing compound and, hence, such a compound can be used singly. If the water-soluble nitrogen-containing compound does not contain a carbon atom in the molecule thereof, it must be used in combination with the water-soluble carbon-containing compound.

The above-described mixed aqueous solution is then evaporated or dried to obtain a mixed fine powder in which the respective components are uniformly mixed in the order of molecule. A suitable temperature for the evaporation or drying is in the range of from 100 to 200° C.

The thus obtained mixed fine powder is calcined in a nitrogen-containing non-oxidative atmosphere to obtain an aluminum nitride powder. The nitrogen-containing non-oxidative atmosphere includes such gases as nitrogen, ammonia, etc. When nitrogen and/or ammonia is used, it is not always required to use other non-oxidative atmosphere in combination.

A suitable temperature for the calcination is in the range of from 1200 to 1800° C. After the formation of aluminum nitride, the residual carbon in the aluminum nitride product can be removed by heat treatment in an oxidative atmosphere at from 550 to 750° C.

The ratio of the starting materials charged is not particularly restricted, but when the yield of aluminum nitride is taken into consideration, the starting materials are preferably charged in a ratio of carbon to aluminum of 0.4/1 or more.

At the time of preparation of aluminum nitride powders (during or after mixing the starting materials but before calcination), at least one additive of calcium salts, yttrium salts and lanthanide salts is added, followed by undergoing the calcination. In this case, though the additive is preferably mixed with the starting materials as an aqueous solution, it can be added at any stage before the calcination.

If the additive is added, it is considered to catalytically function at the time of preparation of aluminum nitride powders, whereby an effect for accelerating the nitriding is revealed. In this case, if an additive which also functions as a sintering aid is used, since it exhibits an effect for accelerating the nitriding and an effect for aiding the sintering at the same time, use of such a type of additive is more advantageous.

In general, since the sintering aid likely lowers heat conductivity of the ultimately obtained aluminum nitride, its compounding amount is restricted. Therefore, when an additive which also functions as a sintering aid is used, the amount of a sintering aid added can be decreased whereby the lowering in heat conductivity of aluminum nitride can be minimized and, hence, the use of such a type of additive is advantageous.

Furthermore, the above-described additive catalytically functions at the time of decarbonizing after calcination in the preparation of aluminum nitride powders, to thereby increase the efficiency of decarbonizing (i.e., lowering the residual carbon amount) or lower the decarbonizing temperature and, hence, the use of the additive is advantageous. To lower the decarbonizing temperature prevents aluminum nitride from occurrence of oxidation at the time of decarbonizing, whereby the purity of the resulting aluminum nitride is increased, leading to an improvement in heat conductivity of aluminum nitride. The lowering in temperature as referred to herein is approximately from 50 to 100° C.

Examples of the calcium salt which can be used include calcium chloride, calcium nitrate, calcium acetate, calcium carbonate, and calcium lactate; examples of the yttrium salt which can be used include yttrium chloride, yttrium nitrate, yttrium lactate, and yttrium acetate; and examples of the lanthanide salt which can be used include lanthanum chloride and lanthanum nitrate.

It is preferred that the additive is soluble in water because it can be uniformly mixed with the starting material powders as an aqueous solution, leading to an effect for accelerating the subsequent nitriding or other steps. Almost all of the compounds which are specifically exemplified above are soluble in water and exhibit a function as the sintering aid.

A suitable amount of the additive which can be used is from 0.3 to 7.0% by weight. However, a preferred amount thereof varies depending on the type of the additive used. For example, in the case of the calcium salt, it is preferably used in an amount of from 0.3 to 4.0% by weight (calculated as CaO) based on the weight of the aluminum nitride powder prepared; and in the case of the yttrium salt or lanthanide salt, it is preferably used in an amount of from 1.0 to 7.0% by weight (calculated as an oxide thereof) based on the weight of the aluminum nitride powder prepared. Further, if two or more additives are used in combination, a preferred amount thereof is from 0.5 to 7.0% by weight (calculated as a total of oxides thereof) based on the weight of the aluminum nitride powder prepared. But, the aforesaid amount of the additive is an amount of the additive compounded together with the starting materials but does not mean an amount of the residual additive or oxide thereof after the sintering. That is, since the additive or oxide thereof is evaporated at the time of sintering, the amount of the additive which actually remains together with aluminum nitride is smaller than the above-specified amount.

If the amount of the additive exceeds the above-specified range, the heat conductivity of the resulting aluminum nitride is lowered, whereas if it is less than the specified range, the catalytic effect or effect as a sintering aid can hardly be obtained. Incidentally, since the amount of the residual additive or oxide thereof varies with the sintering condition, it cannot be unequivocally defined. However, if the amount of the additive is within the above-described range, in the case of the calcium salt, the residual amount is not higher than about 1% by weight (as CaO), and in the case of the yttrium salt or lanthanide salt, it is not higher than about 5% by weight (as an oxide thereof). If the amount of the residual additive is within the above-specified range, the heat conductivity of aluminum nitride is not substantially lowered.

The thus produced aluminum nitride powder can be shaped into various materials such as IC ceramic substrates. For example, when an aluminum nitride ceramic material is shaped by sintering, in order to improve the sintering properties, a sintering aid is usually used. Examples of the sintering aid which can be used include rare earth metal oxides such as yttrium oxide and alkaline earth metal oxides such as calcium oxide. If yttrium chloride or calcium nitrate is also mixed during the preparation of the mixed aqueous solution of the respective starting materials, an aluminum nitride powder in which the sintering aid is uniformly dispersed can be obtained.

In accordance with the process of the present invention, since fine powders wherein the water-soluble aluminum-containing compound or aluminum alkoxide and the water-soluble carbon-containing compound and/or the water-soluble nitrogen-containing compound are uniformly mixed in the order of molecule are calcined in a nitrogen-containing non-oxidative atmosphere, fine and uniform aluminum nitride powders can be obtained rapidly and inexpensively. Further, since the resulting powders are a fine powder, the sintering properties thereof are good.

Moreover, in the case that the mixed powder contains the nitrogen-containing compound, a reducible nitriding atmosphere is locally formed and nitriding reaction is accelerated from the inside of the mixture, whereby aluminum nitride is more rapidly formed.

Incidentally, the basic aluminum chloride exhibits a specific function such that it likely removes impurities present in the starting materials. That is, in the calcination step, by the action of chlorine present in the basic aluminum chloride, impurities present in the starting materials, such as Fe, Si, or Na, are chlorinated and then removed off as chlorides thereof into a gaseous phase. Accordingly, even if low-purity starting materials are used, high-purity aluminum nitride can be obtained. Further, the basic aluminum chloride is stable even at relatively high temperatures, it can easily achieve the chlorination of the impurities.

The present invention is described in more detail with reference to the following examples, but it should not be construed that the invention is limited thereto.

EXAMPLE 1

A mixed aqueous solution containing 1 part by weight of aluminum nitrate nonahydrate, 0.17 part by weight of methyl cellulose (SM Type, a product of Shin-Etsu Chemical Industry Co., Ltd.) and 0.29 part by weight of glycine was prepared. The aqueous solution was evaporated and dried at 150° C. The resulting product was calcined in a nitrogen atmosphere at 1650° C. for 10 hours to obtain an aluminum nitride powder having a purity of 98% or more and an average particle diameter of about 3 μm.

EXAMPLE 2

A mixed aqueous solution containing 1 part by weight of aluminum nitrate nonahydrate, 0.13 part by weight of methyl cellulose (SM Type, a product of Shin-Etsu Chemical Industry Co., Ltd.) and 0.87 part by weight of glycine was prepared. The aqueous solution was evaporated and dried at 150° C. The resulting product was calcined in an ammonia atmosphere at 1650° C. for 5 hours to obtain an aluminum nitride powder having a purity of 98% or more and an average particle diameter of about 2 μm.

EXAMPLE 3

A mixed aqueous solution containing 1 part by weight of aluminum sulfate nonahydrate, 0.60 part by weight of methyl cellulose (SM Type, a product of Shin-Etsu Chemical Industry Co., Ltd.) and 0.44 part by weight of glycine was prepared. The aqueous solution was evaporated and dried at 150° C. The resulting product was calcined in a nitrogen atmosphere at 1600° C. for 10 hours to obtain an aluminum nitride powder having a purity of 98% or more and an average particle diameter of about 2 μm.

EXAMPLE 4

A mixed aqueous solution containing 1 part by weight of aluminum nitrate nonahydrate, 0.12 part by weight of polyvinyl alcohol with a degree of saponification of 90% and 0.18 part by weight of carbonyl hydrazide was prepared. The aqueous solution was evaporated and dried at 150° C. The resulting product was calcined in a nitrogen atmosphere at 1650° C. for 3 hours to obtain an aluminum nitride powder having a purity of 98% or more and an average particle diameter of about 2 μm.

EXAMPLE 5

A mixed aqueous solution containing 1 part by weight of aluminum nitrate nonahydrate, 0.2 part by weight of polyvinyl alcohol with a degree of saponification of 90% and 0.53 part by weight of ethylenediamine was prepared. The aqueous solution was evaporated and dried at 150° C. The resulting product was calcined in a nitrogen atmosphere at 1650° C. for 5 hours to obtain an aluminum nitride powder having a purity of 98% or more and an average particle diameter of about 1 μm.

Each of the aluminum nitride powders obtained in Examples 1 to 5 was mixed with 5% by weight of $Y_2O_3$ as a sintering aid and, after molding, the molding was sintered in a nitrogen atmosphere at 1650° C. for 3 hours to obtain a sintered aluminum nitride ceramic having a density of 98% or more.

EXAMPLE 6

An aqueous solution containing 1 part by weight of basic aluminum chloride (hereinafter "BAC") having an $Al_2O_3$ content of 49.5% and 0.9 part by weight of glucose was prepared. This aqueous solution was evaporated and dried at 150° C. The resulting product was found to contain, as an impurity, Fe in an amount of 1609 ppm calculated based on the weight of aluminum nitride. This product was calcined in a nitrogen atmosphere at 1600° C. for 3 hours to obtain an aluminum nitride powder having a purity of 98.5% or more and an average particle diameter of about 0.3 μm. The thus obtained aluminum nitride powder was found to contain Fe in an amount of 94 ppm calculated based on the weight of aluminum nitride.

EXAMPLE 7

An aqueous solution containing 1 part by weight of the same BAC as used in Example 6, 0.6 part by weight of glucose and 0.4 part by weight of urea was prepared. This aqueous solution was evaporated and dried at 150° C. The resulting product was calcined in a nitrogen atmosphere at 1580° C. for 3 hours to obtain an aluminum nitride powder having a purity of 98.5% or more and an average particle diameter of about 0.4 μm.

EXAMPLE 8

An aqueous solution containing 1 part by weight of the same BAC as used in Example 6 and 2.3 parts by weight of urea was prepared. This aqueous solution was evaporated and dried at 150° C. The resulting product was calcined in a nitrogen atmosphere at 1650° C. for 3 hours to obtain an aluminum nitride powder having a purity of 98.5% or more and an average particle diameter of about 0.8 μm.

EXAMPLE 9

An aqueous solution containing 1 part by weight of the same BAC as used in Example 6 and 0.8 part by weight of methyl cellulose was prepared. This aqueous solution was evaporated and dried at 150° C. The resulting product was calcined in a nitrogen atmosphere at 1650° C. for 5 hours to obtain an aluminum nitride powder having a purity of 98.0% or more and an average particle diameter of about 0.8 μm.

EXAMPLE 10

An aqueous solution containing basic aluminum nitrate expressed by $[Al_{13}O_4(OH)_{25}(H_2O)_{11}](NO_3)_3$ and glucose with a $C/Al_2O_3$ ratio of 80% by weight was prepared. This aqueous solution was evaporated and dried at 150° C. The resulting product was calcined in a nitrogen atmosphere at 1600° C. for 3 hours to obtain an aluminum nitride powder having a purity of 98.5% or more and an average particle diameter of about 0.4 μm.

Each of the aluminum nitride powders obtained in Examples 6 to 10 was mixed with 5% by weight of $Y_2O_3$ as a sintering aid and, after molding, the molding was sintered in a nitrogen atmosphere at 1800° C. for 3 hours to obtain a sintered aluminum nitride ceramic having a density of 98% or more.

EXAMPLE 11

An aqueous solution containing 1 part by weight of basic aluminum chloride having an $Al_2O_3$ content of 49.5% and 1.5 parts by weight of urea was prepared. This aqueous solution was evaporated and dried at 150° C. The resulting product was calcined in a nitrogen atmosphere at 1650° C. for 3 hours to obtain an aluminum nitride powder having a purity of 98.5% or more and an average particle diameter of about 1.0 μm.

EXAMPLE 12

An aqueous solution containing 1 part by weight of the same basic aluminum chloride as used in Example 11 and 0.4 part by weight of glucose was prepared. This aqueous solution was evaporated and dried at 150° C. The resulting product was calcined in a nitrogen atmosphere at 1620° C. for 3 hours to obtain an aluminum nitride powder having a purity of 98.5% or more and an average particle diameter of about 0.6 μm.

EXAMPLE 13

An aqueous solution containing 1 part by weight of the same basic aluminum chloride as used in Example 11, 0.5 part by weight of glucose and 0.3 part by weight of urea was prepared. This aqueous solution was evaporated and dried at 150° C. The resulting product was calcined in a nitrogen atmosphere at 1600° C. for 3 hours to obtain an aluminum nitride powder having a purity of 98.5% or more and an average particle diameter of about 0.4 μm.

EXAMPLE 14

An aqueous solution containing 1 part by weight of the same basic aluminum chloride as used in Example 11, 0.7 part by weight of methyl cellulose (SM Type, a product of Shin-Etsu Chemical Industry Co., Ltd.) and 0.3 part by weight of urea was prepared. This aqueous solution was evaporated and dried at 150° C. The resulting product was calcined in a nitrogen atmosphere at 1620° C. for 3 hours to obtain an aluminum nitride powder having a purity of 98.5% or more and an average particle diameter of about 0.6 μm.

Each of the aluminum nitride powders obtained in Examples 11 to 14 was mixed with 5% by weight of $Y_2O_3$ as a sintering aid and, after molding, the molding was sintered in a nitrogen atmosphere at 1800° C. for 3 hours to obtain a sintered aluminum nitride ceramic having a density of 98% or more.

EXAMPLE 15

An aqueous solution containing 1 part by weight of basic aluminum lactate having an $Al_2O_3$ content of 37% and a lactic acid content of 56%, and 2.0 parts by weight of urea was prepared. This aqueous solution was evaporated and dried at 150° C. The resulting product was calcined in a nitrogen atmosphere at 1650° C. for 5 hours to obtain an aluminum nitride powder having a purity of 98.5% or more and an average particle diameter of about 0.4 μm.

EXAMPLE 16

An aqueous solution containing 1 part by weight of the same basic aluminum lactate as used in Example 15 and 0.5 part by weight of glucose was prepared. This aqueous solution was evaporated and dried at 150° C. The resulting product was calcined in a nitrogen atmosphere at 1650° C. for 5 hours to obtain an aluminum nitride powder having a purity of 98.5% or more and an average particle diameter of about 0.2 μm.

EXAMPLE 17

An aqueous solution containing 1 part by weight of the same basic aluminum lactate as used in Example 15, 0.4 part by weight of D-glucose and 0.3 part by weight of urea was prepared. This aqueous solution was evaporated and dried at 150° C. The resulting product was calcined in a nitrogen atmosphere at 1630° C. for 5 hours to obtain an aluminum nitride powder having a purity of 98.5% or more and an average particle diameter of about 0.3 μm.

EXAMPLE 18

An aqueous solution containing 1 part by weight of the same basic aluminum lactate as used in Example 15, 0.3 part by weight of methyl cellulose (SM Type, a product of Shin-Etsu Chemical Co., Ltd.) and 0.4 part by weight of urea was prepared. This aqueous solution was evaporated and dried at 150° C. The resulting product was calcined in a nitrogen atmosphere at 1650° C. for 3 hours to obtain an aluminum nitride powder having a purity of 98.5% or more and an average particle diameter of about 0.3 μm.

EXAMPLE 19

An aqueous solution containing 1 part by weight of the same basic aluminum lactate as used in Example 15, 0.5 part by weight of polyvinyl alcohol having a degree of saponification of 90%, and 0.1 part by weight of melamine was prepared. This aqueous solution was evaporated and dried at 150° C. The resulting product was calcined in a nitrogen atmosphere at 1650° C. for 5 hours to obtain an aluminum nitride powder having a purity of 98.5% or more and an average particle diameter of about 0.4 μm.

Each of the aluminum nitride powders obtained in Examples 15 to 19 was mixed with 5% by weight of $Y_2O_3$ as a sintering aid and, after molding, the molding was sintered in a nitrogen atmosphere at 1800° C. for 3 hours to obtain a sintered aluminum nitride ceramic having a density of 98% or more.

EXAMPLE 20 TO 26

As the aluminum alkoxide, aluminum isopropoxide or aluminum ethoxide was used, and as the tetra-alkylammonium hydroxide, tetramethylammonium hydroxide (hereinafter "TMA") was used. That is, a 15 wt% aqueous solution of TMA was first prepared, and in this aqueous solution, aluminum isopropoxide or aluminum ethoxide in an amount corresponding to 15% by weight was dissolved. To the solution, a prescribed amount of urea as set forth in Table 1 was added to prepare a mixed solution. A mixture obtained from the mixed solution was calcined at a prescribed temperature (1550° C. for Examples 20 to 22, 1600° C. for Example 23, and 1580° C. for Examples 24 to 26, respectively) for 5 hours to synthesize an aluminum nitride powder.

The result obtained are shown in Table 1.

TABLE 1

| Example No. | Urea or Glucose Amount* (based on TMA solution) (wt %) | AlN Purity (%) | Average Particle Diameter of AlN Powder (μm) |
| --- | --- | --- | --- |
| 20 | 20 | 98.0 | 0.3 |
| 21 | 30 | 98.0 | 0.3 |
| 22 | 40 | 98.0 | 0.3 |
| 23 | 40 | 98.5 | 0.4 |
| 24 | 40 | 98.0 | 0.4 |
| 25 | 30 | 98.5 | 0.2 |
| 26 | 40 | 98.5 | 0.2 |

*The glucose amount is referred to in Examples 25 and 26.
(Note)
(1) The residual carbon content after the calcination was in the range of from 0.2 to 1.5% by weight.
(2) The term "AlN" means aluminum nitride.

EXAMPLE 27

After dissolving 10 g of aluminum isopropoxide (manufactured by Nakarai Chemical Co , Ltd., which is hereinafter referred to as "AIPD") in 10 cc of water, the solution was added with 10 g of triethanolamine and further with 10 cc of water. 3.5 g of glucose was dissolved in the resulting solution, followed by evaporating and drying at 150° C. The resulting product was calcined at 1600° C. for 3 hours, followed by heating at 700° C. for 30 minutes to effect decarbonizing. There was thus obtained an aluminum nitride powder having a purity of 98.5% or more and an average particle diameter of about 0.2 μm.

EXAMPLE 28

After dissolving 10 g of AIPD in 10 cc of isopropanol, the solution was added with 10 g of diethanolamine and further with 8 cc of water. 2.8 g of glucose was dissolved in the resulting solution, followed by evaporating and drying at 150° C. The resulting product was calcined at 1600° C. for 3 hours, followed by heating at 700° C. for 30 minutes to effect decarbonizing. There was thus obtained an aluminum nitride powder having a purity of 98.5% or more and an average particle diameter of about 0.4 μm.

Each of the aluminum nitride powders obtained in Examples 20 to 28 was mixed with 5% by weight of $Y_2O_3$ as a sintering aid and, after molding, the molding was sintered in a nitrogen atmosphere at 1800° C. for 3 hours to obtain a sintered aluminum nitride ceramic having a density of 98% or more.

EXAMPLE 29

A solution (Solution A) of 10 g of glucose (a reagent grade manufactured by Nakarai Chemical Co., Ltd.) as the water-soluble carbon-containing compound dissolved in water and a solution (Solution B) of 10 g of AIPD dispersed in isopropyl alcohol were separately prepared.

Solutions A and B were mixed and thoroughly stirred, whereby AIPD was hydrolyzed to form an aluminum hydrate. Thereafter, the liquid content was removed by evaporation to obtain a mixed solid powder in which the aluminum hydrate and glucose were uniformly mixed. The mixed powder was calcined in a nitrogen atmosphere at 1600° C. for 3 hours to obtain an aluminum nitride powder having a purity of 98.0% or more and an average particle diameter of about 0.5 μm.

EXAMPLE 30

An aluminum nitride powder was prepared in the same manner as in Example 29 except that a solution of 10 g of glucose and 10 g of urea dissolved in water was used as the Solution A. The thus prepared aluminum nitride powder had a purity of 98.5% or more and an average particle diameter of about 0.5 μm.

EXAMPLE 31

A solution (Solution A) of 10 g of AIPD dissolved in 100 g of isopropyl alcohol and a solution (Solution B) of 3.7 g of glycine (manufactured by Nakarai Chemical Co, Ltd.) dissolved in 50 g of water were separately prepared.

Solutions A and B were mixed and reacted while thoroughly stirring to form an amino acid aluminum salt. Thereafter, the liquid content was removed by evaporation. The resulting product was calcined in a nitrogen atmosphere at 1600° C. for 3 hours to obtain an aluminum nitride powder having a purity of 98.0% or more and an average particle diameter of about 1 μm.

EXAMPLE 32

An aluminum nitride powder was prepared in the same manner as in Example 29 except that a solution of 10 g of aluminum methoxide dissolved in methanol was used as the Solution B. The thus prepared aluminum nitride powder had a purity of 98.5% or ore and an average particle diameter of about 0.5 μm.

Each of the aluminum nitride powders obtained in Examples 29 to 32 was mixed with 5% by weight of $Y_2O_3$ as a sintering aid and, after molding, the molding was sintered in a nitrogen atmosphere at 1800° C. for 3 hours to obtain a sintered aluminum nitride ceramic having a density of 98% or more.

EXAMPLE 33

An aqueous solution containing BAC and glucose with a C/Al molar ratio of 3.0/1 was prepared. To this aqueous solution was added each of the additives as shown in Table 2, which had been dissolved in water. In Table 2, the amount of the additive is expressed by wt% calculated as an oxide thereof based on the weight of the prepared aluminum nitride. The preparation of the aluminum nitride powder was carried out at 1560° C. for 6 hours, and the decarbonizing was carried out at 600° C. for one hour. Further, the density and thermal conductivity shown in Table 2 are respectively those of a sintered product obtained by molding the prepared aluminum nitride powder and sintering the molding at 1800° C. for 3 hours.

Other conditions were the same as in Example 6.

TABLE 2

| Run No. | Additive Type | Amount (wt %) | Degree of Nitriding (wt %) | Residual Carbon Content (wt %) | Relative Density (%) | Thermal Conductivity (W/mK) |
|---|---|---|---|---|---|---|
| 1 | Calcium nitrate | 0.5 | 99.0 | 0.10 | >98.5 | 210 |
| 2 | " | 1.0 | 99.5 | 0.08 | >98.5 | 230 |
| 3 | " | 2.0 | 99.5 | 0.07 | >98.5 | 210 |
| 4 | Calcium chloride | 0.5 | 99.0 | 0.10 | >98.5 | 210 |
| 5 | " | 1.0 | 99.5 | 0.08 | >98.5 | 230 |
| 6 | Yttrium nitrate | 3.0 | 99.5 | 0.08 | >98.5 | 220 |
| 7 | " | 5.0 | 99.5 | 0.07 | >98.5 | 240 |
| 8 | Yttrium chloride | 3.0 | 99.5 | 0.08 | >98.5 | 220 |
| 9 | " | 5.0 | 99.5 | 0.07 | >98.5 | 240 |
| 10 | " | 7.0 | 99.5 | 0.05 | >98.5 | 210 |
| 11 | Lanthanum chloride | 5.0 | 99.5 | 0.07 | >98.5 | 210 |
| 12 | Nil | — | 98.5 | 0.15 | 92.0 | 50 |

As is clear from the results shown in Table 2, as the degree of nitriding increases, the residual carbon content lowers. Further, what the density values are higher than that in the case where no additive is mixed demonstrates that the sintering effect reveals by the action of the additive. Moreover, as the amount of the additive increases, the thermal conductivity lowers.

While the invention has been described in detail and with reference to specific embodiments thereof, it will be apparent to one skilled in the art that various changes and modifications can be made therein without departing from the spirit and scope thereof.

What is claimed is:

1. A process for producing aluminum nitride powders, comprising mixing an aluminum polynuclear complex and (1) a water-soluble carbon-containing compound and/or a water-soluble nitrogen-containing and carbon-containing compound or (2) a water-soluble carbon-containing compound and a water-soluble nitrogen-containing compound, with water; drying the mixture to obtain a solid; and calcining said solid in a nitrogen-containing non-oxidative atmosphere.

2. A process as in claim 1, wherein said aluminum polynuclear complex is basic aluminum chloride.

3. A process as in claim 1, wherein said aluminum polynuclear complex is basic aluminum lactate.

4. A process as in claim 1, wherein said water-soluble carbon-containing compound is a saccharide.

5. A process as in claim 4, wherein said saccharide is glucose.

6. A process as in claim 1, wherein said water-soluble nitrogen-containing and carbon-containing compound is urea.

7. A process as in claim 1, wherein the calcination is carried out at a temperature in the range of from 1200 to 1800° C.

8. A process as in claim 1, wherein said nitrogen-containing non-oxidative atmosphere is an atmosphere of nitrogen and/or ammonia.

9. A process as in claim 1, wherein at least one additive of calcium salts, yttrium salts, and lanthanide salts is added at any stage before the calcination.

10. A process as in claim 9, wherein said additive is added in an amount of from 0.3 to 7.0% by weight calculated as an oxide thereof based on the weight of the aluminum nitride produced.

11. A process for producing aluminum nitride powders, comprising mixing an aluminum alkoxide which has been rendered water-soluble and (1) a water-soluble carbon-containing compound and/or a water-soluble nitrogen-containing and carbon-containing compound or (2) a water-soluble carbon-containing compound and a water-soluble nitrogen-containing compound, with water; drying the mixture to obtain a solid; and calcining said solid in a nitrogen-containing non-oxidative atmosphere.

12. A process as in claim 11, wherein said aluminum alkoxide is used as a mixture with a tetraalkylammonium hydroxide, triethanolamine, or diethanolamine.

* * * * *